Dec. 1, 1942.  C. H. EDEN ET AL  2,303,685
HYDRAULIC TRANSMISSON
Filed May 11, 1940  3 Sheets-Sheet 1

Inventors.
Charles Howard Eden.
Edward E. Stevenson.

Attorneys.

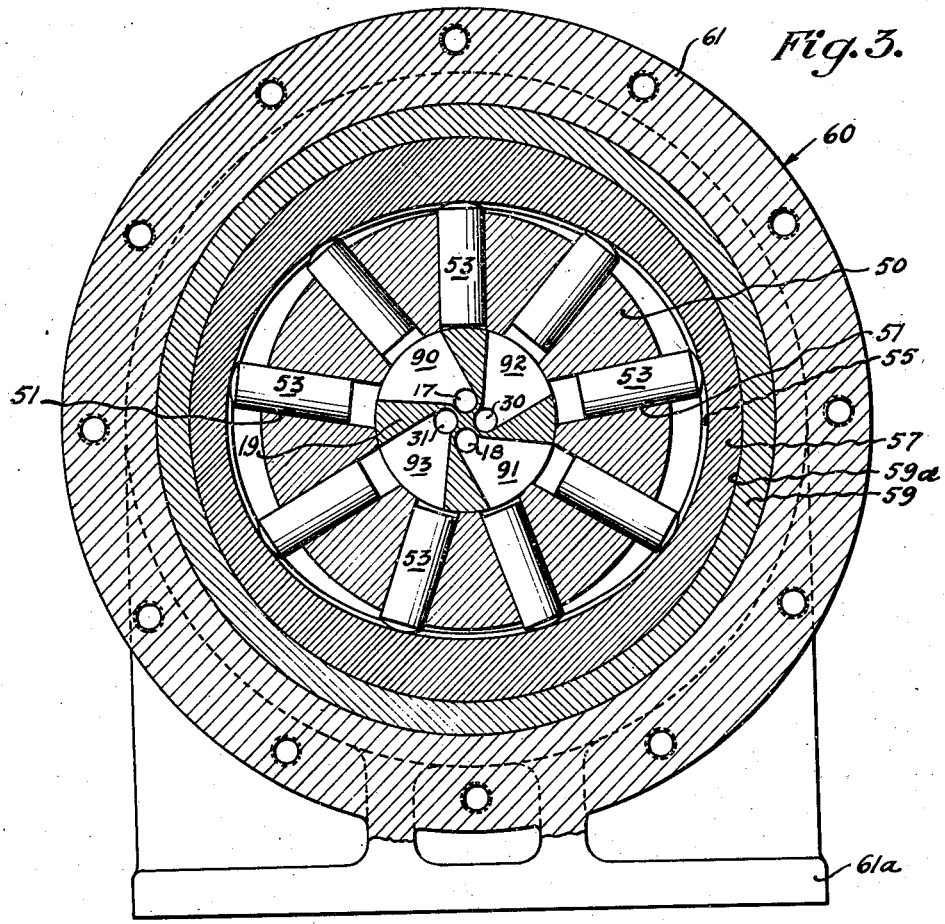
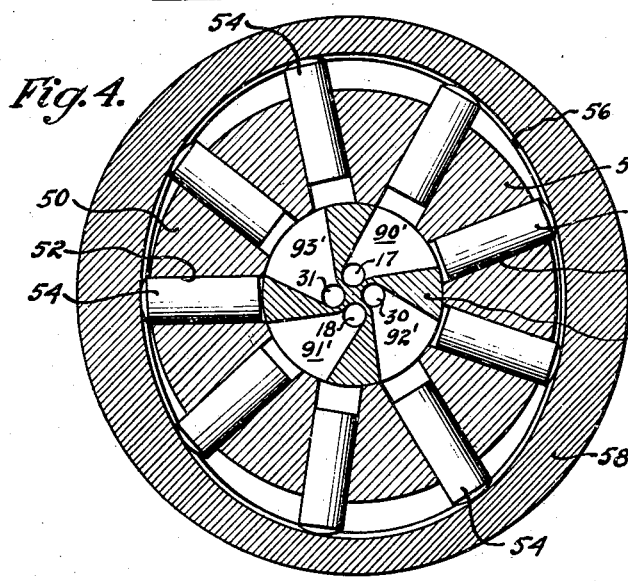
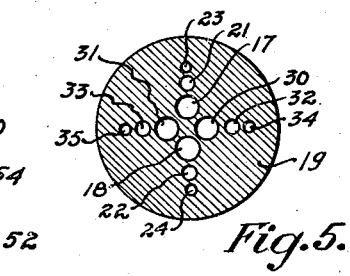
Inventors.
Charles Howard Eden.
Edward E. Stevenson.
Attorneys.

Patented Dec. 1, 1942

2,303,685

UNITED STATES PATENT OFFICE 2,303,685

HYDRAULIC TRANSMISSION

Charles Howard Eden and Edward E. Stevenson,
Los Angeles, Calif.

Application May 11, 1940, Serial No. 334,558

18 Claims. (Cl. 60—53)

This invention relates generally to hydraulic transmissions for converting fluid energy into mechanical energy, or vice versa, and more particularly to hydraulic transmissions having means for inversely varying speed and torque. A typical application of the transmission is as a hydraulic motor, such as may be used to drive a machine tool as a lathe, milling machine, or drilling machine, and the invention will therefore be described with that aspect chiefly in view, but without implied limitation thereto.

A general object of the invention is the provision of a hydraulic transmission, useful as either a motor or a pump, having features of improvement in general design, structure and arrangement, as well as of operation and control.

A further object is the provision of a hydraulic transmission having improved means for inversely varying speed and torque by varying the total volumetric capacity characterized by enhanced facility and flexibility of control.

A still further object is the provision of an improved multiple unit hydraulic transmission of the cam and plunger type, particularly one having means for inversely varying speed and torque through selection of the number of units employed.

The invention is herein illustrated as embodied in the form of a hydraulic motor of the cam and plunger type, and certain features of the invention deal specifically with that particular type of motor. In broader aspects, however, such as that in which multiple power units are employed, with the provision of means for intercoupling selected units, the invention is not necessarily so limited, and the specifically described cam and plunger units are to be considered as merely illustrative of the invention in one of its preferred forms.

A feature of the invention, in effecting variation of volumetric capacity and torque, is the provision of hydraulically controlled means for coupling each power unit of a bank of such units to the next, or to the power output or input element, whereby either one or more of the units may be put into operation. A further and preferred feature of the invention is the provision of means whereby the application of pressure fluid to successive power units automatically results in successively coupling said units to the power output or input element.

Certain features of the invention deal with novel and unique means for selectively intercoupling and driving the units of a bank of alined rotor units of the cam and plunger type.

The pressure fluid may be delivered wholly to the first of the rotor units, with the remainder of said units uncoupled therefrom, in which event maximum speed and minimum torque obtain, or selected numbers of the units may be intercoupled and the pressure fluid divided among those units, with the result of decreased speed but increased torque.

Various additional objects and features of the invention will appear and be made apparent in the course of the following detailed description of a present preferred illustrative embodiment, reference being directed to the accompanying drawings, in which:

Fig. 1 is a view partly in side elevation and partly in longitudinal medial section, showing an embodiment of the invention;

Fig. 2 is a diagrammatic perspective, showing the end portion of the distributer shaft of the unit of Fig. 1, and showing, in diagram, a valvular and circulation system;

Fig. 3 is a transverse section taken on line 3—3 of Fig. 1;

Fig. 4 is a transverse section taken on line 4—4 of Fig. 1;

Fig. 5 is a transverse section taken on line 5—5 of Fig. 1;

Fig. 6 is a transverse section on line 6—6 of Fig. 1;

Fig. 7 is a transverse section taken on line 7—7 of Fig. 1;

Figs. 8 and 9 are transverse sections similar to Figs. 6 and 7, but through corresponding portions of the rotor unit next adjacent to that of Figs. 6 and 7;

Fig. 10 is a transverse section taken on line 10—10 of Fig. 1; and

Fig. 11 is a sectional view of a valve unit which may be substituted for certain pairs of valves shown in Fig. 2.

The invention will be hereinafter described as a multiple-rotor hydraulic motor, though it will be understood that by simply applying power to the power shaft of the motor, it may be transformed into a pump.

An understanding of a suitable external circulation and control valve system for the motor of the present invention will facilitate description and understanding of the motor itself, and the complete description of the motor per se will therefore be prefaced by a preliminary discussion of the functions of a diagrammatically illustrated circulation and valve system adapted for use in connection with the motor. It will be understood that a valvular control mechanism and circulation system to perform these functions may be mechanically designed in a variety of manners. Reference accordingly being directed first to Fig. 2, we indicate at 12 a fluid circulating pump, which may be either a variable or constant volume pump, and which will be understood to be driven by any suitable prime mover such as an electric motor, not illustrated. The output from pump 12 is delivered via conduit 13 and certain distributor valve elements to branch conduits 14, 15 and 16, of which branch 14 has two branches 14a and 14b leading to longitudinal fluid passageways 17 and 18 formed in a longitudinally extending distributer member 19 disposed axially of the motor generally indicated at 20, the passageways 17 and 18 communicating with one rotor unit of the motor as later to be described. In the present instance the member 19 is in the form of a stationary central distributer shaft, ported to direct fluid to one or more units. The passageways 17 and 18 are here shown as disposed on opposite sides of the longitudinal axis of shaft 19. Branch conduit 15 has two branches 15a and 15b, which connect with longitudinal passageways 21 and 22 in shaft 19, positioned just outside the aforementioned passageways 17 and 18, and which will be understood as communicating with a second rotor unit of the motor. Similarly, conduit 16 has branches 16a and 16b connected to longitudinal passageways 23 and 24 in shaft 19, disposed just outside passageways 21 and 22 and which will be understood as communicating with the third rotor unit of the motor.

Fluid exhausted from the several rotor units returns to pump 12 by way of a conduit 25, leading from branch conduits 26, 27 and 28, of which conduit 26 connects with branch conduits 26a and 26b leading from longitudinal fluid discharge passageways 30 and 31 formed in shaft 19 in symmetrical relation but spaced 90° from the previously described passageways 17 and 18, the passageways 30 and 31 receiving fluid exhausted from the first rotor unit. Similarly, branch conduit 27 leads from branches 27a and 27b connected to longitudinal fluid discharge passageways 32 and 33 formed in shaft 19 just outside passageways 30 and 31, respectively, and being understood as receiving exhaust fluid from the second rotor unit, while branch conduit 28 leads from branches 28a and 28b connected with longitudinal fluid discharge passageways 34 and 35 formed in shaft 19 and positioned just outside passageways 32 and 33, respectively, and being understood as receiving exhaust fluid from the third rotor unit.

There is thus provided a closed circulation system, the circulated medium, which may be oil, air, inert gas, steam, etc., being delivered continuously from the pump, circulated to and from selected rotors of the motor, and then returned to the pump.

Distributer valves 37, 38 and 39 are indicated as placed in conduits 14, 15 and 16, respectively, and distributer valves 40, 41 and 42 are indicated as placed in conduits 26, 27 and 28, respectively. It is to be understood that the showing of the conduit system and valves of Fig. 2 is entirely diagrammatic in nature, intended merely to illustrate the type of closed circuit distributive system to be employed, and that the system and the several individually illustrated valve elements 37 to 42 may in practice be any suitable type of unitary valve and conduit structure capable of performing the functions to be described. It will later be explained how the pairs of valves 37 and 40, 38 and 41, and 39 and 42, may each be simultaneously actuated if desired.

It will be evident that with valves 37 and 40 open and with the remaining valves closed, the output from pump 12 will be delivered totally to longitudinal passageways 17 and 18 in distributer shaft 19, and it will later become apparent that this total volume of fluid is used to drive the first rotor of the motor, and is then returned to the pump via passageways 30 and 31. With valves 38 and 41 also open, the output from the pump will be divided between passageways 30, 31, 32 and 33, of which the two latter lead to the second rotor of the motor, and will be returned via passageways 17, 18, 21 and 22. And with all valves open, the output from the pump will be divided between passageways 17, 18, 21, 22, 23 and 24, to be divided between the three rotors of the motor, and will be returned via passageways 30, 31, 32, 33, 34 and 35.

Motor 20 embodies a plurality of coaxial, alined rotor units, of which there may be any desired number, though we have here illustrated three such units A, B and C. These rotor units surround distributer shaft 19, in end to end opposition with one another. Each such unit, such as A, comprises a cylinder and plunger assembly embodying a centrally bored circular cylinder member 50 having a rotating and fluid sealing fit on shaft 19. In the particular illustrative embodiment of the invention here being described, cylinder member 50 is a rotor, although mere reversal would make it a stationary part. In any case it and shaft 19 are relatively rotatable; and it will be understood that in using the term rotor we mean to imply only relative rotation. Preferably shaft 19 does not serve as a bearing for the rotor, so that the fluid sealing fit will not be subject to any substantial wear. Bearing arrangements are rather provided between the member 19 and cylinder member 50. Cylinder member 50 has two axially spaced sets of radially disposed cylinder bores 51 and 52, in which are mounted lap-fitted hardened plungers 53 and 54. It may here be mentioned that the cylinder bores and plungers for successive units A, B, etc., may all be of the same diameter, though as here shown the diameter is reduced in the instance of unit B. The reason for this will be set forth at a later point in the specification.

The outer ends of the two sets of plungers 53 and 54 of each rotor engage the hardened elliptical cam faces 55 and 56 of a pair of stationary cam rings 57 and 58, respectively, the latter seating on annular seats 59a formed at opposite edges of a seating ring 59 mounted within the exterior motor housing generally designated at 60.

As here shown, housing 60 is made up of a pair of end members 61 and 62, provided with integral supports 61a and 62a, respectively, and one or more intermediate members 63, which are assembled about the several rotor units A, B, etc., as shown, and are provided with abutting flanges secured together by screws 64. The adjacent housing members have opposed faces 65 which engage and tightly clamp the cam and seating rings between them when the screws 64 are set up, all as will be clearly understood from an inspection of the drawings. It will be understood that with this construction, the transmission may be made up with as many rotor units as desired, it only requiring that a distributer shaft 19 be selected of a length and with fluid passageways proper for the number of rotor units selected.

End casting 62 of housing 60 is provided with a reduced hub 70 and distributer shaft 19 is keyed to this hub as indicated at 71. End casting 61 of housing 60 is provided with a reduced hub 72, within which is journaled a power shaft 74, the latter being mounted in coaxial relation with stationary distributer shaft 19. Formed on the inner end of shaft 74 is an enlarged cup-like extension 75, which reaches over the end of shaft 19 and engages and is drivingly connected with the cylinder member 50 of first rotor unit A. As a typical means for providing driving connection between cylinder member 50 and member 75, we here simply show dowel pins 76. Cup member 75 is supported by a bearing 77 seated within end housing member 61, and shaft 74 is supported by a bearing 78 located immediately in back of or adjacent cup member 75, said bearing 78 being seated within hub 72, as illustrated, and being spaced from bearing 77 as by spacer sleeve 79. A collar 80 is shown as screwthreaded on shaft 74 and set up against the inner ring 78a of bearing 78.

The inner end of stationary distributer shaft 19 is received with rotational fit within the cup member 75 on the end of rotatable shaft 74, the end portion of shaft 19 having a reduced extremity 82, which is supported within a bearing 83 seated inside cup member 75 between annular shoulder 84 on shaft 19 and an end disk 85a held by a screw 85 threaded into the end of shaft extremity 82. The cup member 75 on the inner end of shaft 74 is thus supported for rotation on the inner end of stationary shaft 19.

Stationary shaft 19 and rotatable shaft 74 are provided with suitable fluid packing inside the respective housing hubs 70 and 72, as indicated at 88 and 89, respectively.

The previously mentioned longitudinal pressure fluid passageways 17 and 18 in distributer shaft 19 communicate with pressure fluid ports 90 and 91, which open through opposite sides of shaft 19 in the radial plane of the first set of plungers 53. Longitudinal exhaust fluid passageways 30 and 31 in shaft 19 communicate in like manner with exhaust fluid ports 92 and 93 of similar type opening through opposite sides of shaft 19 and located symmetrically or at equal spacing with reference to ports 90 and 91, all as clearly illustrated in Fig. 3. Ports 90, 91, 92 and 93 communicate with the inner ends of successive cylinder bores 51 during rotation of cylinder member 50, as will be obvious.

Assuming the parts to be in the position of Fig. 3, it will be evident that the fluid under pressure within ports 90 and 91 will act against the inner ends of the associated plungers 53 to move said plungers outwardly, forcing their outer ends against the inclined plane presented by the elliptical face 55 of cam ring 57, and thereby causing the cylinder member 50 to rotate in a counter-clockwise direction as viewed in Fig. 3. The portion of the elliptical cam face opposite the plungers whose inner ends are in communication with ports 92 and 93 forces said plungers radially inwardly, said plungers thus forcing exhaust fluid through ports 92 and 93 into exhaust passageways 30 and 31. Each plunger cylinder is in communication with each of the two pressure and two exhaust ports for about 90° of rotation. Of course, by utilizing passageways 30 and 31 for pressure fluid and passageways 17 and 18 for exhaust fluid, the direction of rotation may be reversed.

Reference is now directed to Fig. 4, showing the second set of plungers 54 and the second elliptically faced cam ring 56 of rotor unit A. Pressure fluid passageways 17 and 18 in shaft 19 communicate with ports 90' and 91', opening through opposite sides of shaft 19 in the radial plane of the second set of plungers 54, and discharge passageways 30 and 31 in shaft 19 communicate with ports 92' and 93' opening through opposite sides of said shaft in the same plane, the arrangement being the same as that of the section of Fig. 3, excepting that the several ports 90', 91', 92' and 93' are displaced by 90° as compared with the corresponding ports 90, 91, 92 and 93 of Fig. 3. Also as will be evident from a comparison of Figs. 3 and 4, the major axis of the elliptical cam face 56 is likewise displaced by 90° as compared with the major axis of the elliptical cam face 55. The second set of plungers 54 (those of Fig. 4), operate the same as the set of plungers 53, but their power action being displaced by 90° from the first set, the flow of power delivered to the rotor by both sets is substantially equally distributed throughout the full 360° of rotation.

Reference now being directed to Figs. 1, 6 and 7, it will be understood that rotor unit B is the same in all substantial respects as rotor unit A, differing only in the diameter of the plungers, which is subject to modification, and the same is true of rotor unit C, shown partially in section in Figs. 8 and 9. Corresponding elements of the rotor units A, B and C are for convenience designated by similar reference numerals, but with the sub letter b adjoined in the case of unit B and with the sub letter c adjoined in the case of unit C. Reference to Figs. 6 and 7 will show that the pressure fluid ports 90b and 91b which deliver pressure fluid to plungers 53b receive pressure fluid from longitudinal distributor passageways 21 and 22, respectively, and that pressure fluid ports 90b' and 91b' which deliver to plungers 54b likewise receive pressure fluid from passageways 21 and 22, respectively. The exhaust fluid ports 92b and 93b, corresponding to plungers 53b, communicate with exhaust passageways 32 and 33, respectively, and similarly the exhaust ports 92b' and 93b' corresponding to plungers 54b communicate with exhaust fluid passageways 32 and 33, respectively. It will be understood that when pressure fluid is delivered via passageways 21 and 22, rotor unit B will be driven in the manner previously described in connection with rotor unit A, the exhaust fluid being returned via passageways 32 and 33.

Figs. 8 and 9 show that the pressure fluid and exhaust ports which deliver pressure fluid to and receive exhaust fluid from rotor unit C communicate in a similar manner with the pressure fluid passageways 23 and 24, and exhaust fluid passageways 34 and 35, respectively, of distributer shaft 19. As additional rotor units are incorporated in the motor, the distributer shaft will have additional pressure fluid passageways located outside the passageways illustrated, and the pressure fluid and exhaust fluid ports will communicate therewith in a manner similar to that shown in the units illustrated. Thus, while we have here shown but three rotor units, it will readily be understood how either more or less of such rotor units may be employed, and the present illustration of three rotor units will be understood as implying no limitation on the number of such units that may be employed in practice.

From the foregoing description it will now be understood that rotor A will be propelled, and will propel power take-off shaft 74, if pressure fluid be supplied to distributer passageways 17 and 18; rotor B will also be propelled if pressure fluid be supplied to distributer passageways 21 and 22, and rotor unit C will also be propelled if pressure fluid be supplied to distributer passageways 23 and 24. And it has been described how the first rotor A of the bank of rotors is permanently coupled to power shaft 74. There remains for description means in accordance with the invention for coupling the successive remaining rotor units B, C, etc., to the power shaft as pressure fluid is delivered to them. A feature of the invention is the provision of clutch means for coupling up the successive rotor units B, C, etc. Specifically and preferably this is shown as clutch mechanism for successively coupling the several units to the one just ahead of it in the series. A further feature is the provision of means whereby the coupling of successive rotor units is accomplished hydraulically and automatically by virtue of an application of the pressure fluid to successive clutch units as it is delivered to successive rotor units. One form of illustrative means for accomplishing the purposes stated will now be described.

The cylinder members 50 of the several rotors are formed on their sides remote from power take-off shaft 74 with axial annular projections 95 surrounding shaft 19, and these projections 95 are over-lapped by and received within axial, annular projections 96 extending from the opposed sides of adjacent cylinder members 50, the meeting surfaces of the projections 95 and 96 being formed with running fit. An annular recess 97 sunk in the periphery of projection 96 and the annular face 98 of the adjacent cylinder member 50 cooperate to provide a seat for the inner ring of a ball bearing assembly 99, the outer ring of which is seated against housing member 63. Hydraulically actuated clutch means presently to be described act between the overlapping annular projections 95 and 96. The last cylinder member 50 of the series is provided with an annular, axial projection 100, unequipped with clutch means, and supported by a bearing 101 seated within end housing member 62.

The clutch means in the illustrative form here shown embodies a plurality of plungers 110 disposed radially of annular projections 95 and 96 (see Figs. 1 and 10), with enlarged piston heads 111 on their inner ends. Heads 111 reciprocate in radial cylinder bores 112 formed in annular projection 95 and opening to distributer shaft 19, the plungers 110 working in reduced radially disposed bores 113 extending from bores 112 through projection 95, the bores 113 being adapted to register with similar radially disposed bores 114 in overlapping projection 96, into which the plungers are adapted to be projected. The outer ends of bores 114 may be provided with plugs 115 to prevent the escape of any pressure fluid leaking past plungers 110. The cylinder space outside each piston head 111 is in communication via a fluid passageway 116 (Fig. 1) with an annular peripheral groove 117 extending around distributor shaft 19, which groove receives pressure fluid by way of a pair of fluid passageways 118 and 119 in said shaft from pressure fluid passageways 17 and 18, respectively. The pressure fluid flowing in passageways 17 and 18, and being delivered to drive rotor A, is thus constantly acting outside piston heads 111, tending to force said heads radially inwardly. In a like manner, when pressure fluid is supplied to rotor unit B via fluid passageways 21 and 22, part of that pressure fluid flows through fluid passageways 118b and 119b to an annular groove 117b around shaft 19, and from there via passageways 116b to the cylinder spaces outside the piston heads of rotor unit C of the clutch plungers where the pressure acts in an inward direction on said heads.

The cylinder space inside each clutch piston head 111 for rotor unit B is in communication with pressure fluid passageways 21 and 22 of the adjacent rotor unit B via angularly disposed fluid passageways 120 and a peripheral groove 121 extending around shaft 19 at a point opposite cylinder bores 112. Corresponding arrangements will be understood to be made for the cylinder spaces below the clutch piston heads for rotor unit C.

Assuming that only unit A is in operation, which condition is brought about by opening control valves 37 and 40, valves 38, 39, 41 and 42 being closed, the entire volume of fluid delivered by pump 12 is supplied to the rotor of unit A, and pressure fluid accordingly flows to the cylinder spaces above clutch piston heads 111 of unit B. At such time there will be no pressure fluid within the inlet passageways 21 and 22 for rotor unit B, and there will hence be no pressure fluid acting outwardly on said clutch piston heads 111 of unit B. The piston heads will accordingly be held in an inwardly retracted position, with the plungers 110 removed from the bores 114 in member 96, so that rotor unit A is free to revolve independently of rotor unit B which merely floats.

Assuming next that rotor unit B is to be cut in, valves 38 and 41 are opened, with the result that pressure fluid from pump 12 is divided between passageways 17 and 18 leading to rotor A and passageways 21 and 22 leading to rotor B, the total volume of fluid delivered to the motor remaining the same as before. The pressure fluid now flows from passageways 21 and 22 via passageways 120 and groove 121 to the cylinder spaces below clutch piston heads 111 of rotor B, so that there is then fluid at the same pressure above and below said piston heads 111. Now because of the differential of effective areas above and below piston heads 111, the plungers will be forced outwardly to the clutching position illustrated in Figs. 1 and 10, the plungers finding and engaging in the radially disposed bores 114 in projection 96 and thereby acting to clutch rotor B to rotor A and thence to power shaft 74.

Fig. 1 of the drawings shows rotor C de-clutched from rotor B, the clutch plunger members being in inwardly retracted position caused by application of the fluid pressure from passageways 21 and 22 to the spaces outside pistons 111, there being no pressure fluid inside said pistons owing to the control valves 39 and 42 being closed.

Thus as the control valves are operated to supply pressure fluid to successive rotors beyond the first (permanently coupled) rotor of the series, hydraulically actuated clutch means automatically operate to couple the successive rotors to the one next ahead, and thus to the power shaft.

It will be evident from what has been said that with the control valves in a position to deliver the total output of pressure fluid of pump 12 to fluid passageways 17 and 18, rotor A will be driven and the remaining rotors will be de-clutched and idle, power take-off shaft 74 being driven directly and solely from rotor A. Under such circumstances, the speed of rotation is at a maximum. If increased torque, with reduced speed, should be required, the control valves are manipulated to divide the pressure fluid between passageways 17, 18, 21 and 22, which results in clutching rotor B to rotor A, and at the same time dividing the volume of pressure fluid between rotors A and B. This of course results in diminishing the speed and increasing the torque of the motor as the total volumetric capacity of the mechanism has been increased. Now by manipulating the control valves to distribute the pressure fluid between all three rotors A, B and C, rotor C is automatically clutched to rotor B, and all three rotors are driven, with the result of still further decreased speed but correspondingly increased torque.

Attention is called to the smaller diameter of the plungers of rotor B as compared with the plungers of rotor A. These plungers as well as the plungers of rotor C, may all be of the same diameter, in which case cutting in rotor B would result in reducing the speed by one-half and multiplying the torque by two, while cutting in rotor C would result in reducing the original speed by one-third and multiplying the original torque by three. These speed and torque ratios may be modified as desired by proportioning the relative diameters of the plungers of the several rotors, and the plungers of rotor B are accordingly shown as of a diameter somewhat less than the diameter of the plungers of rotor A.

It will be noted that the pairs of control valves 37 and 40, 38 and 41, and 39 and 42, may preferably be opened and closed together. Fig. 11 shows merely diagrammatically how the two valves of each such pair may be operated by a single manual manipulation. Thus, the fluid lines 14 and 26 of Fig. 2 may be connected to a valve body 140 fitted with a valve plug 141 having two ports 142 and 143 which constitute the valves 37 and 38, and which are adapted to be registered simultaneously with the inlet and outlet connections of the valve body with said lines 14 and 26. Valve plug 141 may be operated by a single manual lever or handle 145. It will be understood that such a valve may be substituted for each of the pairs of valves 37 and 40, 38 and 41, and 39 and 42. Or the several pairs of valves 37, 40 and 38, 41 and 39, 42, may all be constituted in one valve mechanism. Fig. 11 shows the pairs 37, 40 and 38, 41 so constituted in a single valve device, the ports 146 and 147 constituting the valves 38 and 41 to control the passages to and from rotor unit B. The several ports are so shaped that the passages to rotor A will be simultaneously opened first: and then, while those ports remain open, the ports controlling the passages for unit B will be simultaneously opened by further valve movement. Thus the control of all the rotors may be incorporated in a single valve device.

The hydraulic transmission of the present invention has now been described principally as a motor, though as above noted, by simply applying power to the power take-off shaft 74, it may be transformed into a pump. The claims are therefore to be construed to cover the transmission whether used as a motor or as a pump. Moreover, certain reversals of stationary and rotating members are possible, and are to be considered as the full equivalent of the specific embodiment illustrated, and as coming within the scope of the claims appended hereto. Thus, while in the particular embodiment of the invention here illustrated, the distributor shaft 19 and the cam rings are stationary, with the cylinder members 50 rotatable, these relations may be reversed, and the claims are to be construed as covering any such mere reversal. And it will be understood that reference throughout the specification and claims to certain members of the mechanism as rotors denotes broadly a rotative relation between said members and certain other parts of the mechanism, rather than necessary rotation within the stationary external housing or frame.

It will be understood that while we have here shown and described one present preferred embodiment of our invention, this is for illustrative purposes only, and various changes in design, structure and arrangement may be made without departing from the spirit and scope of the invention or of the appended claims.

We claim:

1. In a fluid pressure mechanism, the combination including a plurality of coaxial hydraulic rotors, a rotatable shaft, and hydraulically controlled means for coupling selected rotors to said shaft by virtue of application of pressure fluid to the respective rotors.

2. In a fluid pressure mechanism, the combination including a plurality of coaxial rotors, separate fluid passageways adapted to convey pressure fluid to and from selected rotors, a rotatable shaft, and means controlled by the pressure of the fluid in passageways associated with the selected rotors for coupling said selected rotors to said shaft.

3. In a fluid pressure mechanism, the combination including a plurality of alined coaxial hydraulic rotors, and hydraulically controlled clutch means for coupling to one of said rotors any selected number of the remaining rotors by virtue of application of pressure fluid to the selected rotors.

4. In a fluid pressure mechanism, the combination including a series of alined coaxial rotors, separate fluid passageways adapted to convey pressure fluid to and from selected rotors, and hydraulically actuated clutch means between successive rotors of the series for coupling said rotors successively to the first rotor of the series by virtue of the flow of fluid in the passageways associated with the successive rotors.

5. In a fluid pressure mechanism, the combination including a plurality of alined coaxial rotors, separate pairs of pressure fluid and exhaust fluid passageways for conveying fluid to and from successive rotors, unitary valve means for correspondingly controlling the pressure fluid and exhaust fluid passageways for each rotor, and hydraulically actuated clutch means for each rotor for clutching that rotor to the next, said clutch means being actuated by fluid pressure within the pressure fluid passageway for that rotor.

6. In a fluid pressure mechanism, the combination including two alined coaxial rotors, separate pressure fluid passageways communicating with each of the rotors, a clutch member adapted to couple one of the rotors to the other, and clutch actuating means actuatable by the presence of fluid pressure in the passageway connected with the first mentioned rotor to couple that rotor with the other, and actuatable by the presence of fluid pressure in the passageway connected with the other rotor to uncouple the rotors.

7. In a fluid pressure mechanism, the combination including two alined coaxial rotors, separate pressure fluid passageways communicating with each of the rotors, a clutch member adapted to couple one of the rotors to the other, the clutch member comprising a plunger mounted in a rotor and projectible into coupling engagement with another rotor, and including opposing differential pressure areas, means communicating pressure from the fluid passage of said other rotor to the lesser pressure area of the plunger, and means communicating pressure from the fluid passage of said one rotor to the greater pressure area of the plunger.

8. In a fluid pressure mechanism, the combination of a row of alined axially bored rotors, each of which comprises a body having a plurality of radially disposed cylinder bores and a plurality of plungers mounted in said cylinder bores, an elliptical cam ring engaged by the outer portions of said plungers, a rotatable shaft coaxial and drivingly connected with the rotor at one end of said row, pressure fluid and exhaust fluid distributing means for the cylinder bores of each of said rotors extending through the axial bores of said rotors and opening to the inner ends of the cylinder bores of said rotors, and selective fluid pressure actuated clutch means for clutching adjacent rotors to one another to couple any selected number of said rotors to said end rotor, the clutch means for so coupling a given rotor to said end rotor being actuated by the pressure of the fluid distributed to said rotor by said distributing means.

9. In a fluid pressure mechanism, the combination of a relatively stationary distributer shaft, a row of relatively rotating rotors rotatably mounted in end to end opposition about said distributer shaft, each of said rotors comprising a rotatable body having a plurality of radially disposed cylinder bores and a plurality of plungers mounted in said bores, a relatively stationary elliptical cam ring engaged by the outer portions of said plungers, longitudinal pressure fluid and exhaust fluid passageways in said distributer shaft for each of said rotors, said passageways opening through the sides of said shaft to the inner ends of the cylinder bores of corresponding rotors, fluid pressure actuated clutch means for clutching adjacent rotors to one another to couple any selected number of said rotors to the rotor at one end of said row, the clutch means for so coupling a given rotor to said end rotor being actuated by the pressure of the fluid distributed to said rotor by the associated fluid pressure passageway in said distributer shaft.

10. In fluid pressure mechanism, the combination including a central relatively fixed fluid pressure distributing shaft, a plurality of fluid pressure rotors mounted concentrically about the distributing shaft, said central shaft having separate longitudinal passages and lateral ports for the several rotors, and a single valvular device for controlling all said passages.

11. In fluid pressure mechanism, the combination including a central relatively fixed fluid pressure distributing shaft, a plurality of fluid pressure rotors mounted concentrically about the distributing shaft, said central shaft having separate longitudinal passages and lateral ports for the several rotors, fluid pressure actuated clutch means for coupling the several rotors together, and a single valvular device for controlling all said passages.

12. A fluid pressure motor for a fluid pressure system including a pump in a closed circulatory system with such motor and in which a given volume of fluid may be continuously circulated through the motor, characterized by a power delivery shaft and a plurality of fluid pressure actuatable rotors associated with the shaft, clutch means selectively actuatable by fluid pressure in the closed circulatory circuit to couple one at least of said rotors to the shaft, and means for controllably varying the speed and torque of the shaft by selectively applying fluid pressure of the closed circuit to the clutch means and applying fluid pressure of the closed circuit to the corresponding rotor.

13. A fluid pressure motor for a fluid pressure system including a pump in a closed circulatory system with such motor and in which a given volume of fluid may be continuously circulated through the motor, characterized by a power delivery shaft and a plurality of fluid pressure actuatable rotors associated with the shaft, and one of the rotors being rotatively coupled with the shaft, the circulatory system having a branch which applies fluid pressure to said shaft coupled rotor and another branch capable of applying fluid pressure to another of the rotors, clutch means actuatable by fluid pressure in the second mentioned branch to couple the second mentioned rotor to the shaft, and valvular means for controlling the second mentioned branch.

14. In a fluid pressure mechanism, the combination including a plurality of rotors adapted to operate coactively when connected together, and hydraulically controlled clutch means for coupling one of the rotors to another, actuatable by virtue of application of pressure fluid to the one rotor to couple that rotor to the other and actuatable by virtue of application of pressure fluid to the other rotor to uncouple the rotors one from the other.

15. In a fluid pressure mechanism, the combination of a row of alined axially bored rotors each provided with a fluid pressure operative element having pressure communication with its axial bore, a rotatable shaft coaxial and drivingly connected with the rotor at one end of the row, pressure fluid and exhaust fluid distributing means for the pressure operative elements of the several rotors extending through the axial bores of the rotors and opening to the several pressure communications of the rotors, and selective fluid pressure actuated clutch means for clutching adjacent rotors to one another to couple any selected number of said rotors to said end rotor, the clutch means for so coupling a given rotor to said end rotor being actuated by the pressure of the fluid distributed to said rotor by said distributing means.

16. In a fluid pressure mechanism, the combination of a row of alined axially bored rotors each provided with a fluid pressure operative element having pressure communication with its axial bore, a rotatable shaft coaxial and drivingly connected with the rotor at one end of the row, a relatively stationary distributor shaft extending longitudinally through the several axial bores of the rotors, longitudinal pressure fluid and exhaust fluid passageways in said distributor shaft for each of said rotors, said passageways opening through the sides of said distributor shaft to the several pressure communications of the rotors, fluid pressure actuated clutch means for clutching adjacent rotors to one another to couple any selected number of said rotors to the rotor at one end of said row, the clutch means for so coupling a given rotor to said end rotor being actuated by the pressure of the fluid distributed to said rotor by the associated fluid pressure passageway in said distributor shaft.

17. In a fluid pressure mechanism, the combination of a row of alined co-axial fluid-pressure-operative rotors, a rotatable shaft drivingly connected to the rotor at the head end of the row, clutches associated with each of the other rotors and selectively operative by virtue of fluid pressure supply to the several other rotors to couple each respective other rotor to the rotor next ahead of it in the row, and a unitary valve and distribution means operative to apply fluid pressure successively to all the rotors in their sequence in the row beginning with the rotor at the head end.

18. In a fluid pressure mechanism, the combination of a row of alined co-axial fluid-pressure-operative rotors, a rotatable shaft drivingly connected to the rotor at the head end of the row, clutches associated with each of the other rotors and selectively operative by virtue of fluid pressure supply to the several other rotors to couple each respective other rotor to the rotor next ahead of it in the row, the clutches being further selectively actuatable by virtue of fluid pressure supply to the rotor next ahead to uncouple the rotor associated with the corresponding clutch, and a unitary valve and distribution means operative to apply fluid pressure successively to all the rotors in their sequence in the row beginning with the rotor at the head end.

CHARLES HOWARD EDEN.
EDWARD E. STEVENSON.